(12) United States Patent
Lee et al.

(10) Patent No.: US 11,759,698 B2
(45) Date of Patent: Sep. 19, 2023

(54) SMART CUBE AND METHOD OF OPERATING THE SAME

(71) Applicant: Tae Hyung Lee, Seoul (KR)

(72) Inventors: Tae Hyung Lee, Seoul (KR); Woo Jun Lee, Seoul (KR)

(73) Assignee: GENIEWOOS INC., Seoul (KR)

( * ) Notice: Subject to any disclaimer, the term of this patent is extended or adjusted under 35 U.S.C. 154(b) by 203 days.

(21) Appl. No.: 17/431,969

(22) PCT Filed: Dec. 18, 2019

(86) PCT No.: PCT/KR2019/017974
§ 371 (c)(1),
(2) Date: Aug. 18, 2021

(87) PCT Pub. No.: WO2020/171361
PCT Pub. Date: Aug. 27, 2020

(65) Prior Publication Data
US 2022/0143492 A1    May 12, 2022

(30) Foreign Application Priority Data

Feb. 19, 2019    (KR) ........................ 10-2019-0019100

(51) Int. Cl.
    *A63F 9/24*        (2006.01)
    *A63F 9/08*        (2006.01)

(52) U.S. Cl.
    CPC .............. *A63F 9/24* (2013.01); *A63F 9/0826* (2013.01); *A63F 2009/2451* (2013.01); *A63F 2009/2488* (2013.01); *A63F 2009/2494* (2013.01)

(58) Field of Classification Search
USPC ..................................... 273/146, 7
See application file for complete search history.

(56) References Cited

U.S. PATENT DOCUMENTS

| 8,267,786 | B2* | 9/2012 | Ikeda | A63F 13/2145 |
| | | | | 463/36 |
| 8,834,271 | B2* | 9/2014 | Ikeda | A63F 13/213 |
| | | | | 463/36 |
| 9,498,709 | B2* | 11/2016 | Ikeda | A63F 13/211 |
| 10,137,365 | B2* | 11/2018 | Ikeda | A63F 13/235 |
| 10,143,918 | B2* | 12/2018 | Hodgson | A63F 13/98 |
| 11,027,190 | B2* | 6/2021 | Ikeda | A63F 13/214 |

(Continued)

*Primary Examiner* — Pierre E Elisca

(57) ABSTRACT

Disclosed are a smart cube including a core housing having an accommodation space therein, a plurality of blocks having a surface formed therein to correspond to an outer circumference of the core housing and coupled to each other to be rotatable in a group around the core housing, and a controller configured to recognize a position of at least one of the blocks and to calculate a solution to place blocks having the same outer surface on at least one surface of the cube, wherein the block includes types of shaft blocks coupled to a center of each of top, bottom, front, rear, left, and right surfaces of the core housing, edge blocks in contact with each side surface of the shaft block, and corner blocks interposed between the adjacent edge blocks, the controller recognizes a position of at least one of the blocks based on a rotation direction and a rotation amount of the shaft block, and the plurality of blocks visually outputs a next step of a current step of the solution including a plurality of steps.

13 Claims, 13 Drawing Sheets

(56) References Cited

U.S. PATENT DOCUMENTS

| | | | |
|---|---|---|---|
| 11,077,359 B1* | 8/2021 | Wigh | A63F 9/0842 |
| 2011/0304651 A1* | 12/2011 | Shimura | A63F 13/2145 |
| | | | 345/661 |
| 2019/0329402 A1* | 10/2019 | Cappello | G05B 19/0426 |

* cited by examiner

[FIG. 1]
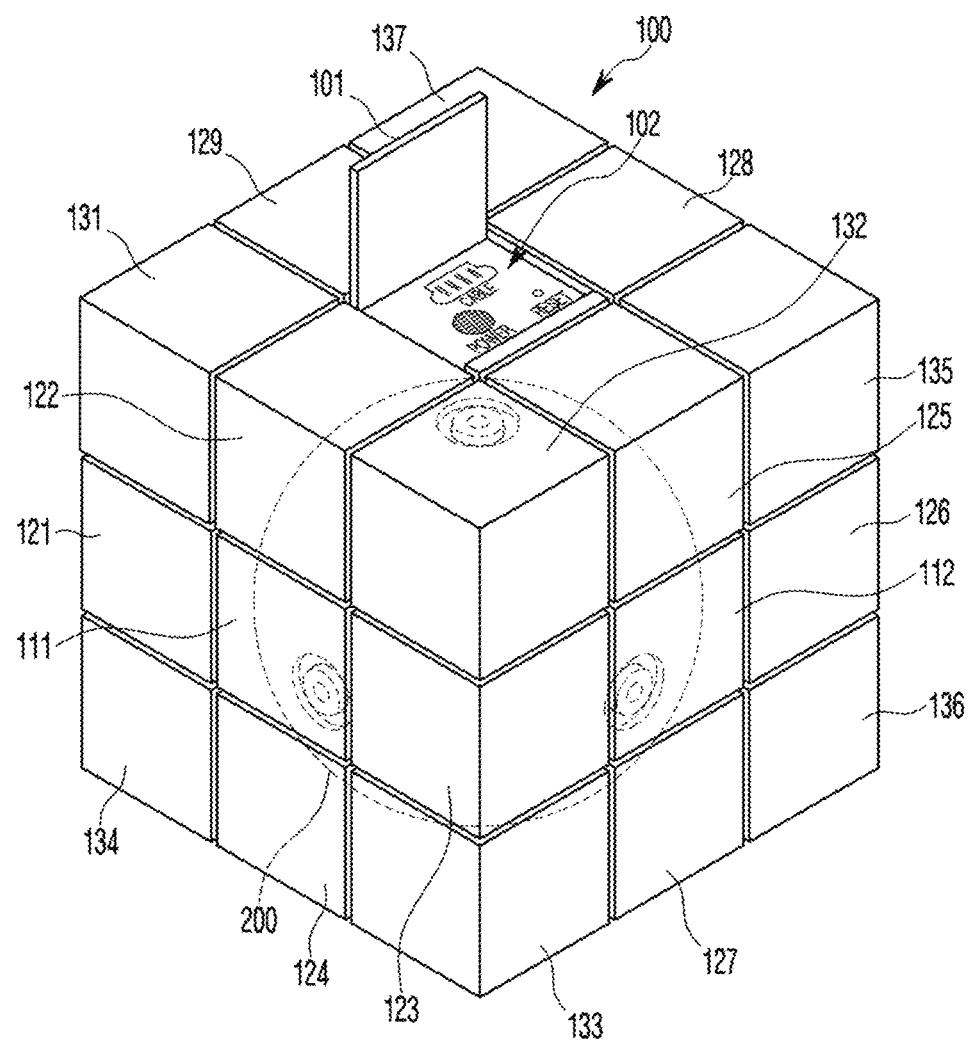

[FIG. 2]
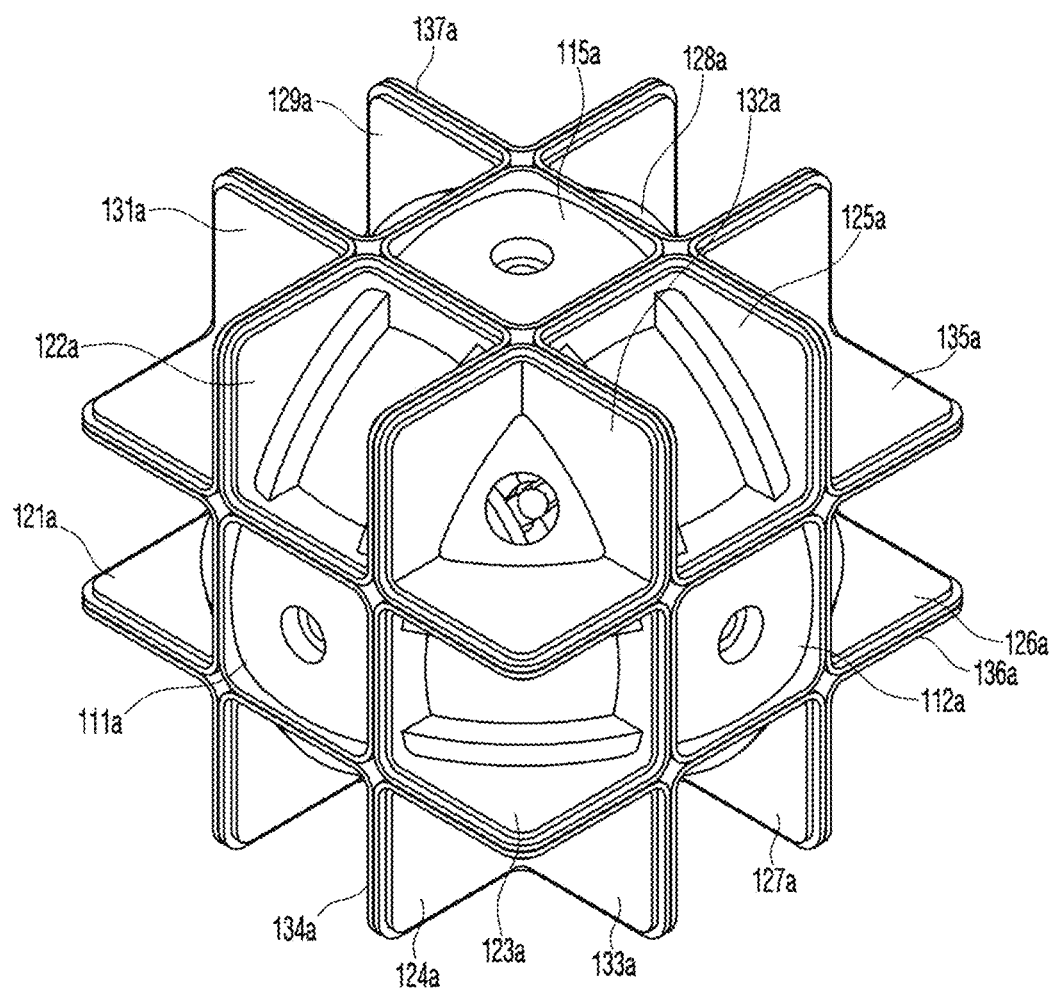

[FIG.3]
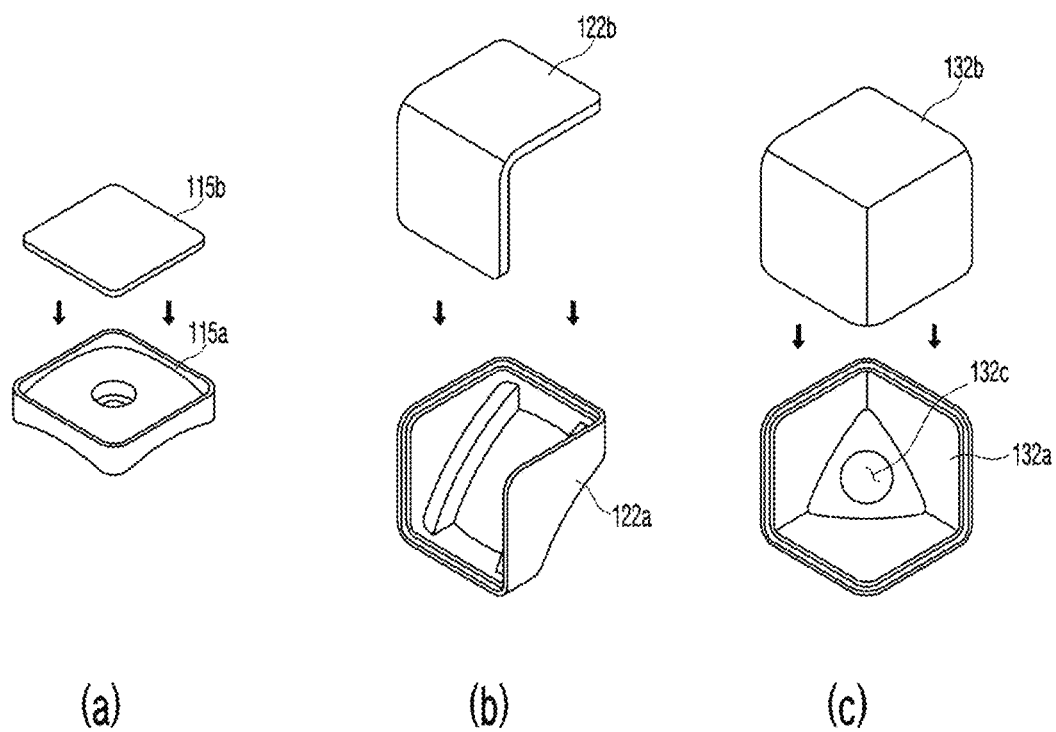
(a)　　　　　　　　(b)　　　　　　　　(c)

[FIG.4]
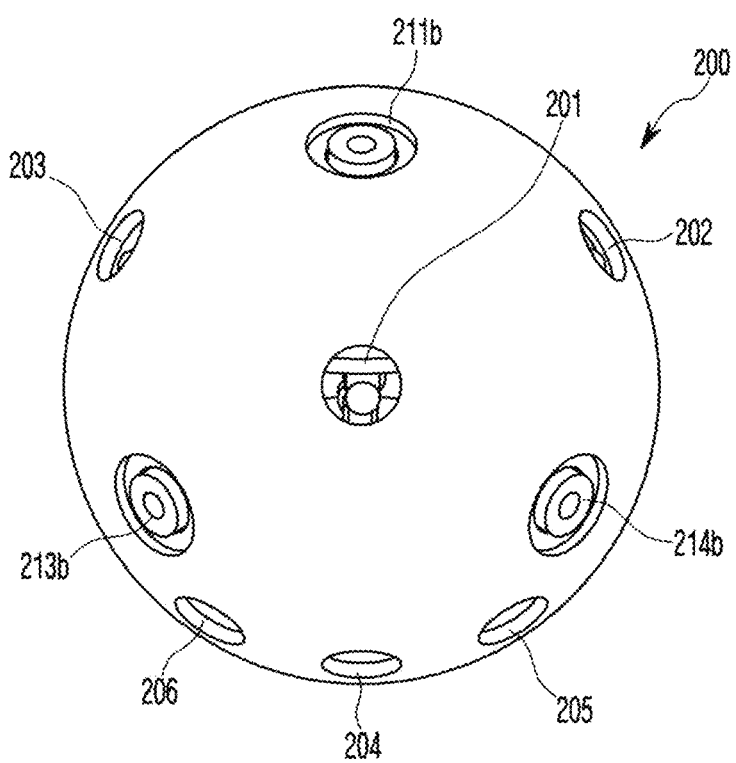

[FIG.5]
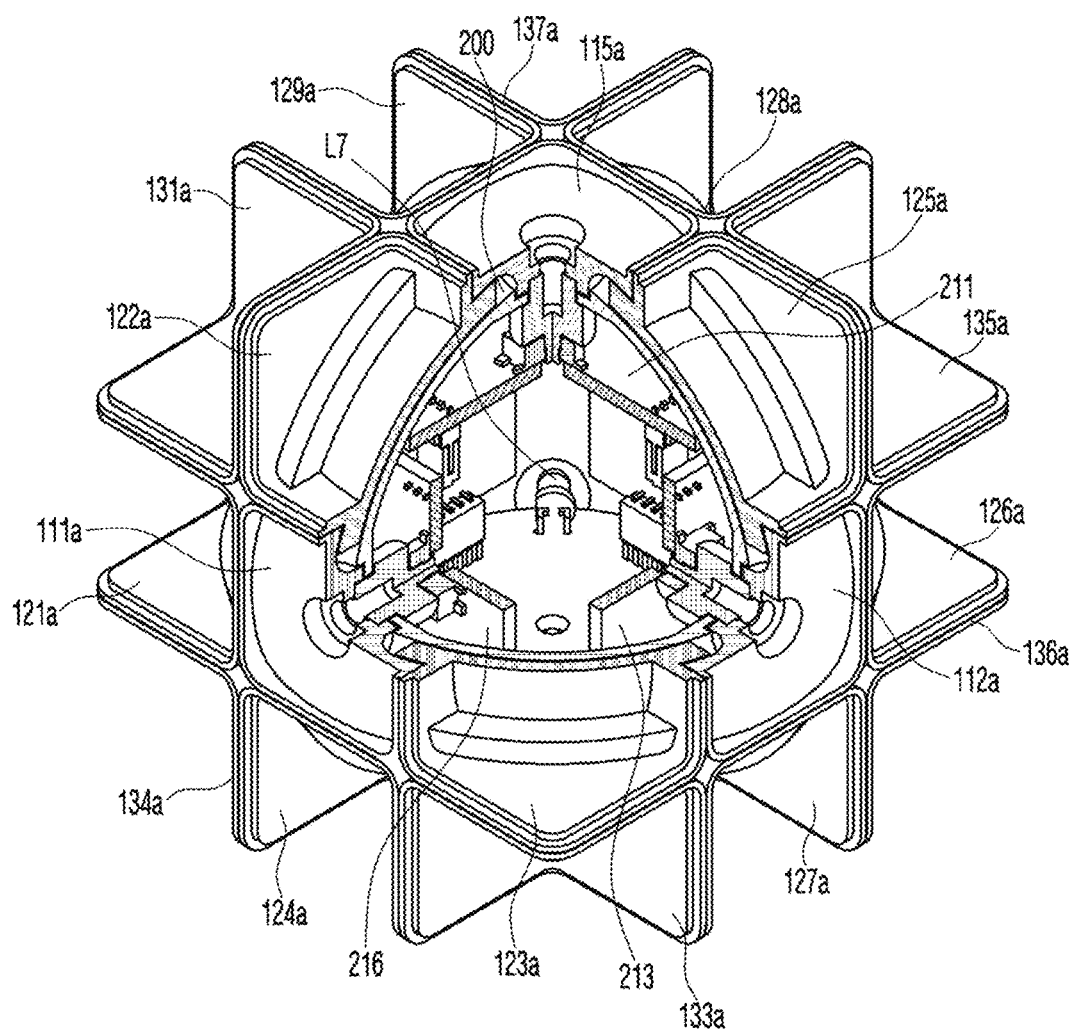

[FIG.6]
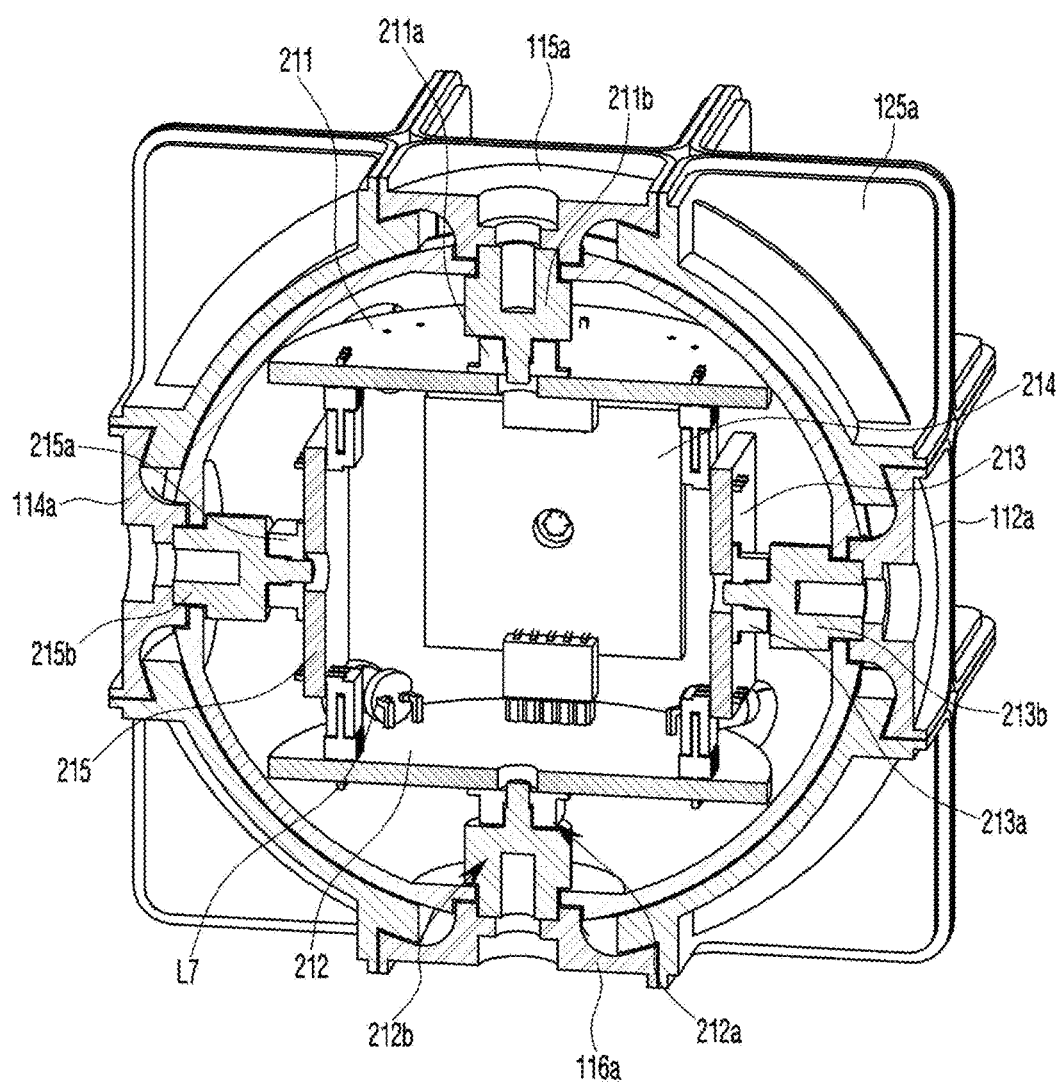

[FIG.7]
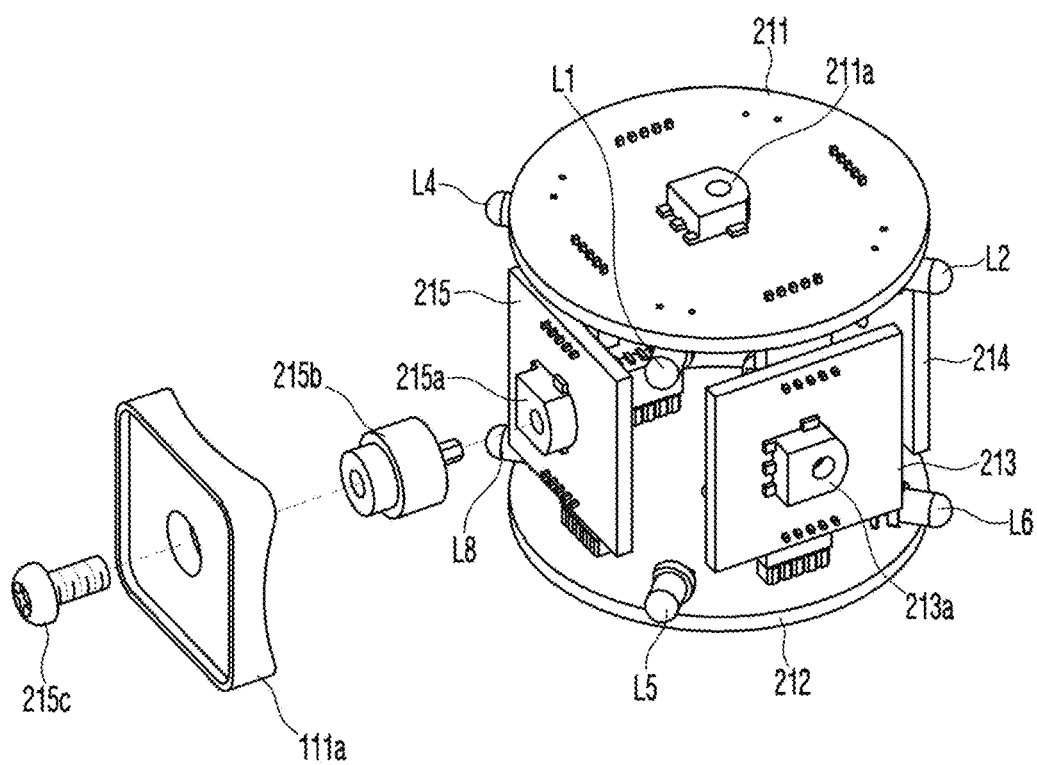

[FIG.8]
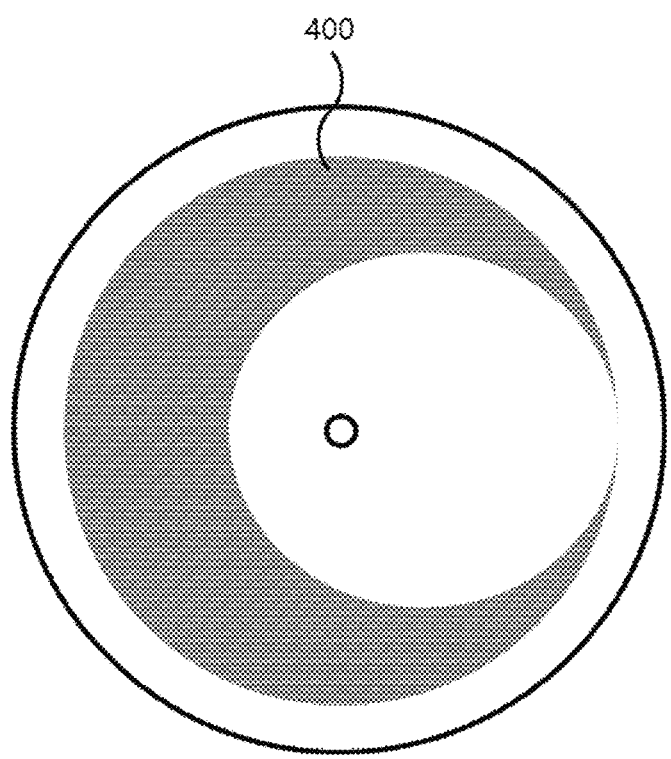

[FIG.9]
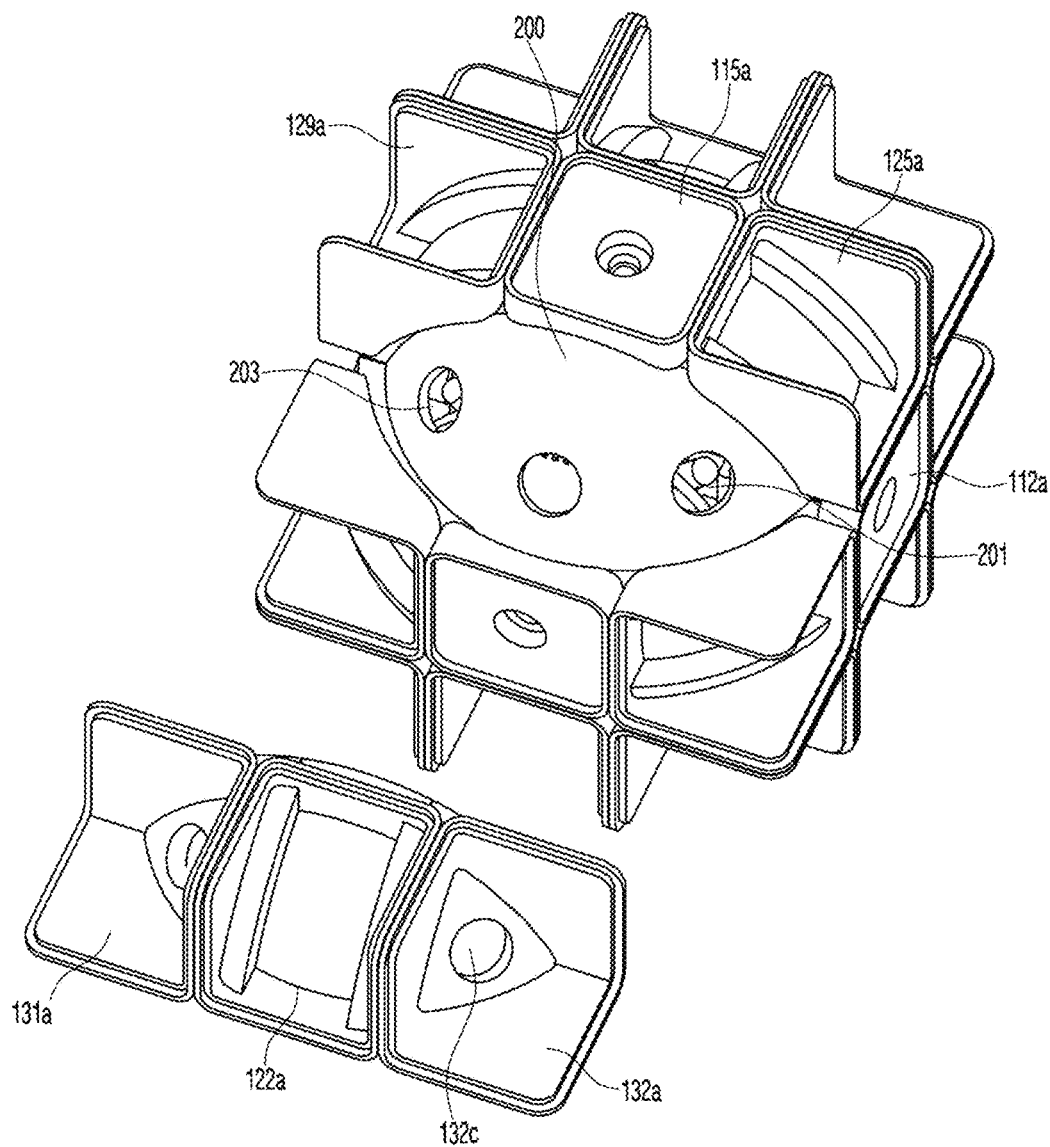

[FIG.10]
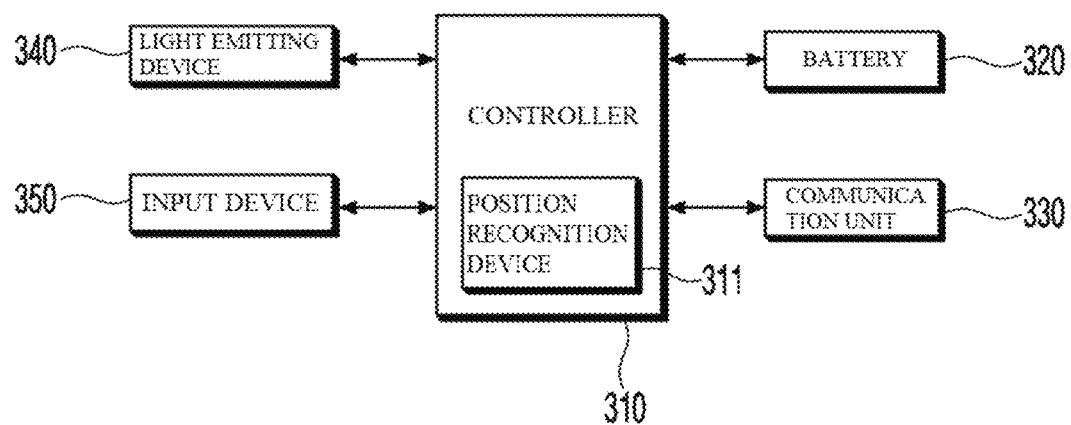

[FIG.11]
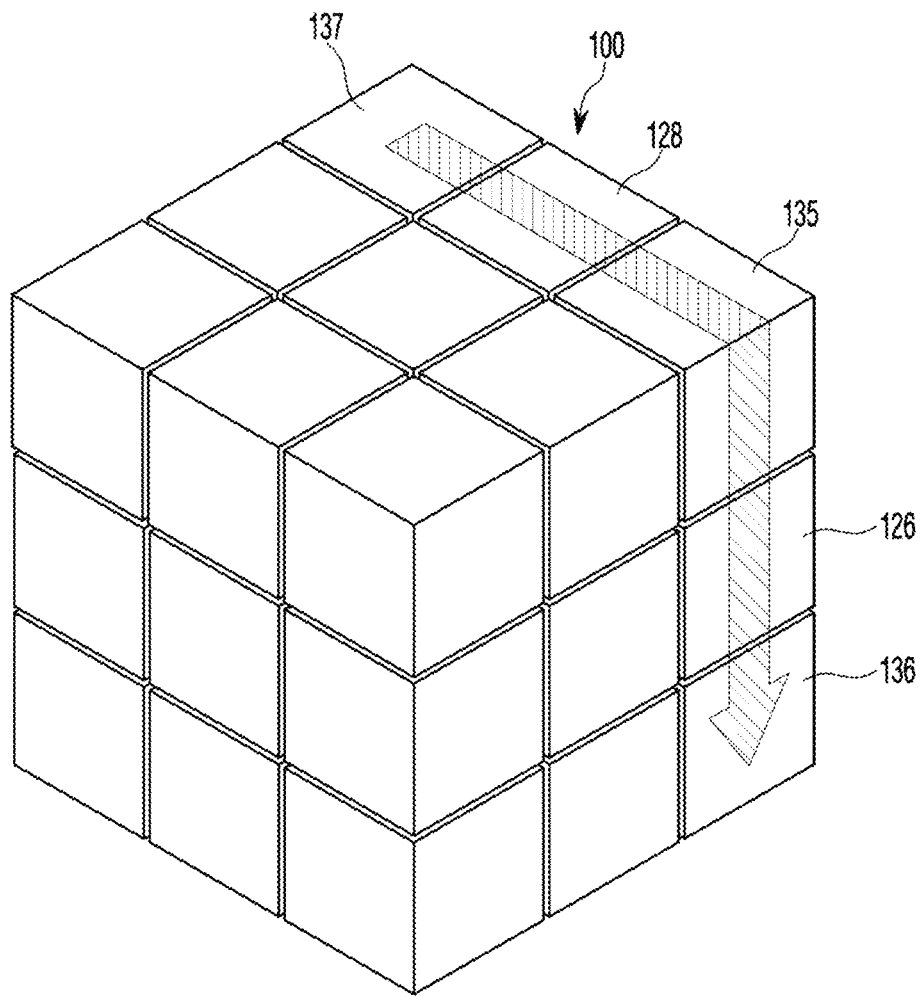

[FIG.12]
(a) 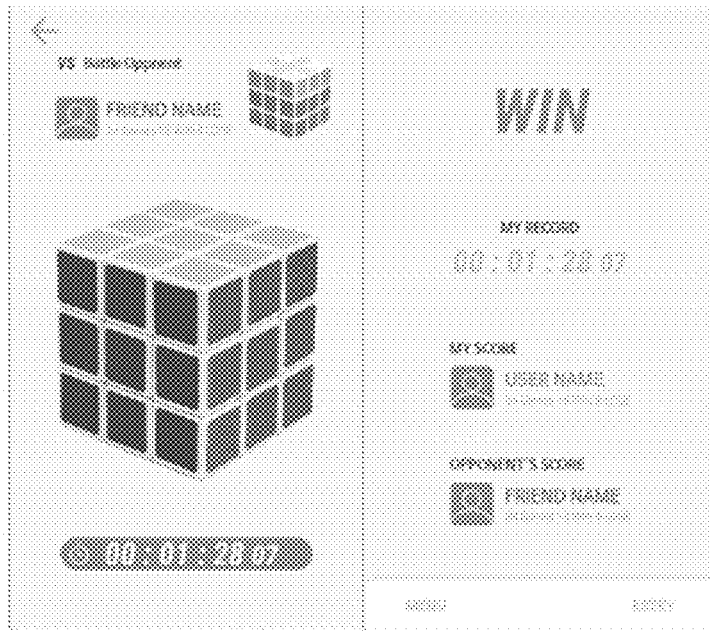
(b) 
(c) 

[FIG.13]
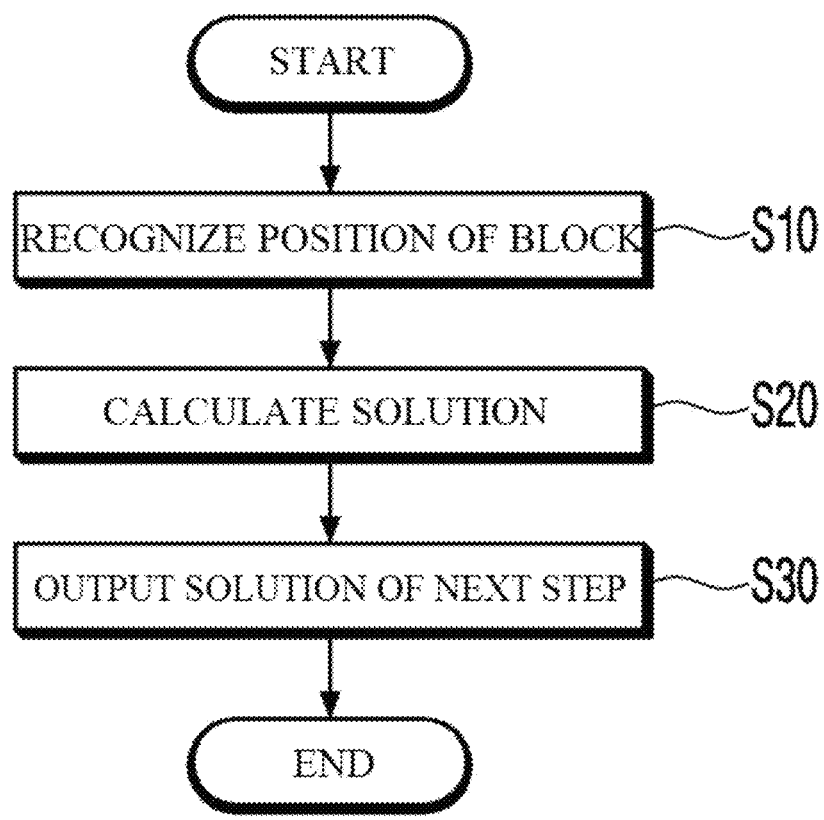

SMART CUBE AND METHOD OF OPERATING THE SAME

TECHNICAL FIELD

The present disclosure relates to a smart cube and a method of operating the same, and more particularly, to a smart cube and a method of operating the same for visually providing a solution of a cube puzzle to a user such that anyone can easily solve the cube puzzle.

BACKGROUND ART

A general cube puzzle device (hereinafter referred as a cube) is formed in a cube shape and is configured such that 9 cells are shown on each of 6 faces.

The cube has a different cell color for each face and is mainly used to enjoy color matching games and to improve intelligence development in the game process, and is thus used as a toy for intelligence development or education.

The cube is a good tool as a brain development tool, but a normal user has difficulty in solving the cube puzzle, and existing textbooks or video tutorials that provide solutions are difficult to understand. Accordingly, the cube fails to actively draw attention from ordinary users.

Thus, there is a need for technology to address this issue.

DISCLOSURE

Technical Problem

Therefore, the present disclosure has been made in view of the above problems, and it is one object of the present disclosure to provide a smart cube and a method of operating the same for intuitively providing a solution to a user such that anyone can easily solve a cube that is rather difficult.

It is another object of the present disclosure to provide a smart cube connectable to communicate with an external terminal and operable as an input device or a controller of the external terminal, and a method of operating the smart cube.

Technical Solution

In accordance with one aspect of the present disclosure, provided is a smart cube including a core housing having an accommodation space therein, a plurality of blocks having a surface formed therein to correspond to an outer circumference of the core housing and coupled to each other to be rotatable in a group around the core housing, and a controller configured to recognize a position of at least one of the blocks and to calculate a solution to place blocks having the same outer surface on at least one surface of the cube, wherein the block includes types of shaft blocks coupled to a center of each of top, bottom, front, rear, left, and right surfaces of the core housing, edge blocks in contact with each side surface of the shaft block, and corner blocks interposed between the adjacent edge blocks, the controller recognizes a position of at least one of the blocks based on a rotation direction and a rotation amount of the shaft block, and the plurality of blocks visually outputs a next step of a current step of the solution including a plurality of steps.

According to an embodiment, the block may include a block cover that forms an outer surface of the cube, and an intermediate stationary unit having a surface that supports the block cover and is in contact with the outer circumference of the core housing.

According to an embodiment, the core housing may accommodate a battery and a circuit board for implementing the controller in the accommodation space, the smart cube may include an inductive sensor installed on a substrate in the core housing, and a conductor plate installed inside the intermediate stationary unit of the shaft block to face the inductive sensor, the conductor plate having a width that changes in a circumferential direction, and the controller may recognize the rotation direction and the rotation amount of the shaft block.

According to an embodiment, the core housing may accommodate a battery and a circuit board for implementing the controller in the accommodation space, and the smart cube may further include a rotation connector coupled between an encoder installed on a substrate in the core housing and the intermediate stationary unit and coupled to allow the intermediate stationary unit to rotate around the encoder.

According to an embodiment, one of the blocks may include a door to be opened and closed, and a panel including an input device for receiving user input or a charging terminal for charging the battery may be exposed when the door is opened, and the panel may be electrically connected to the circuit board through the encoder and the rotation connector.

According to an embodiment, the smart cube may further include at least one light emitting device configured to make the block emit light, and the light emitting device may allow at least two blocks to be rotated to sequentially blink in a rotation direction according to the solution.

According to an embodiment, the corner block may include a corner block cover that forms an outer surface of the cube, and a corner intermediate stationary unit having a surface that supports the corner block cover and is in contact with an outer circumference of the core housing, the outer housing may include at least one first light outlet allowing light of the light emitting device to be emitted outward, and the corner block cover may include at least one second light outlet for allowing light to be emitted through the first light outlet to be emitted outward.

According to an embodiment, the smart cube may further include a communication unit connected to communicate with an external terminal and configured to transmit information on a position of the at least one block.

According to an embodiment, the smart cube may further include a communication unit connected to be able to communicate with an external terminal and configured to transmit information on rotation of the block to the terminal to allow the smart cube to operate as a control input device of content reproduced by the terminal.

According to an embodiment, the edge block may include an edge block cover that forms an outer surface of the cube, and an edge intermediate stationary unit having a surface that supports the edge block cover and is in contact with an outer circumference of the core housing, the outer housing may include at least one first light outlet for allowing light of the light emitting device to be emitted outward, and the edge block cover may include at least one second light outlet for allowing light passing through the first light outlet to be emitted outward.

In accordance with another aspect of the present disclosure, provided is a method of operating a smart cube including a plurality of blocks having a surface formed therein to correspond to an outer circumference of an outer circumference of a core housing having an accommodation space therein and coupled to each other to be rotatable in a group around the core housing, the method including recognizing a position of at least one of the blocks, by a controller, calculating a solution to place blocks having the same outer surface on at least one surface of the cube, by the controller, and visually outputting a next step of a current step of the solution including a plurality of steps by the plurality of blocks, wherein the block includes types of shaft blocks coupled to a center of each of top, bottom, front, rear, left, and right surfaces of the core housing, edge blocks in contact with each side surface of the shaft block, and corner blocks interposed between the adjacent edge blocks, and the recognizing the position may include recognizing a position of at least one of the blocks based on a rotation direction and a rotation amount of the shaft block.

According to an embodiment, the outputting may include allowing the blocks to be rotated to sequentially blink according to the solution by at least one light emitting device for making each of the blocks emit light.

According to an embodiment, the method may further include transmitting information on rotation of the block to the terminal to allow the smart cube to operate as a control input device of content reproduced by the terminal, by a communication unit of the smart cube, connected to be able to communicate with an external terminal.

In accordance with another aspect of the present disclosure, provided is a computer-readable recording medium having recorded thereon a program for executing the method of operating the smart cube.

Advantageous Effects

According to the present disclosure, a solution may be intuitively provided to a user such that anyone is capable of easily solving a cube that is rather difficult.

According to the present disclosure, a smart cube may be connected to be able to communicate with an external terminal and may be capable of operating as an input device or a controller of the smart cube.

DESCRIPTION OF DRAWINGS

FIG. 1 is a diagram showing an overall appearance of a smart cube according to an embodiment of the present disclosure.

FIG. 2 is a diagram showing an outer appearance of a smart cube with a block cover opened according to an embodiment of the present disclosure.

FIG. 3 is a diagram showing components of a block according to an embodiment of the present disclosure.

FIG. 4 is a diagram showing an outer appearance of a core housing according to an embodiment of the present disclosure.

FIG. 5 is a cross-sectional view of a portion of FIG. 2.

FIG. 6 is a half cross-sectional view of FIG. 2.

FIG. 7 is a diagram illustrating arrangement of a substrate according to an embodiment of the present disclosure.

FIG. 8 is a diagram showing a conductor plate according to an embodiment of the present disclosure.

FIG. 9 is a diagram illustrating a position of a light outlet according to an embodiment of the present disclosure.

FIG. 10 is a diagram showing the configuration of a smart cube according to an embodiment of the present disclosure.

FIG. 11 is a diagram illustrating an example of an operation of a smart cube according to an embodiment of the present disclosure.

FIG. 12 is a diagram showing an example of content using which a smart cube is used as a controller of an external terminal according to an embodiment of the present disclosure.

FIG. 13 is a stepwise flowchart illustrating a method of operating a smart cube according to an embodiment of the present disclosure.

BEST MODE

Hereinafter, an exemplary embodiment of the present disclosure will be described in detail with reference to the accompanying drawings. In describing the present disclosure, when it is determined that a detailed description of a related known technology obscures the gist of the present disclosure, the detailed description thereof will be omitted. In order to clearly explain the present disclosure in the drawings, parts irrelevant to the description are omitted, and similar reference numerals are assigned to similar parts throughout the specification. Also, throughout the specification, when a part "includes" a certain component, it means that other components may be further included, rather than excluding other components, unless otherwise stated.

Smart Cube

FIG. 1 is a diagram showing an overall appearance of a smart cube according to an embodiment of the present disclosure. FIG. 10 is a diagram showing the configuration of a smart cube according to an embodiment of the present disclosure.

As shown in FIGS. 1 and 10, the smart cube according to an embodiment of the present disclosure may include a core housing 200 having an accommodation space therein, a plurality of blocks 111 to 137 having a surface formed therein to correspond to an outer circumference of the core housing 200 and coupled to each other to be rotatable in a group around the core housing 200, and a controller 310 for recognizing the position of at least one of the blocks 111 to 137 and calculating a solution to place blocks having the same outer surface on at least one surface of the cube.

However, the components shown in FIGS. 1 and 10 are not required, and thus a smart cube having more or fewer components may be implemented.

Hereinafter, the components will be sequentially described.

As shown in FIG. 1, a cube 100 according to an embodiment of the present disclosure may be shaped like a square with 6 surfaces and may be a 3×3 cube including 9 blocks located at the top, 8 blocks located at the middle, and 9 blocks located at the bottom, a total of 26 blocks, but the present disclosure is not limited thereto.

The cube 100 may include the core housing 200 having the accommodation space formed therein, and a battery 320 and/or circuit boards 211 to 216 for implementing the controller 310, a communication unit 330, etc. that are driven by the battery 320 may be positioned in the accommodation space of the core housing 200, as described below.

FIG. 4 is a diagram showing an outer appearance of a core housing according to an embodiment of the present disclosure.

As shown in FIG. 4, the core housing 200 may be formed approximately spherical, and at least one first light outlets 201 to 206 may be formed in at least one side surface to allow light of a light emitting device connected to the circuit boards 211 to 216 positioned in the accommodation space inside the core housing 200 to be emitted outward.

In the core housing 200, at least portions of rotation connectors 211b to 216b for coupling with blocks positioned on side and bottom surfaces may be exposed. That is, the rotation connectors 211b to 216b may be installed through an outer surface of the core housing 200.

As shown in FIG. 7, one end of the rotation connectors 211b to 216b may be coupled to encoders 211a to 216a, the other end of the rotation connectors 211b to 216b may be coupled to shaft intermediate stationary units 111a to 116a, and the rotation connectors 211b to 216b may be fixedly coupled to the shaft intermediate stationary units 111a to 116a by coupling devices 211c to 216c to allow the shaft intermediate stationary units 111a to 116a to rotate around the encoders 211a to 216a.

As described above, blocks coupled to the rotation connectors 211b to 216b may be shaft blocks 111 to 112, and the shaft blocks 111 to 112 may be positioned in the center of each side of the cube 100 and may only rotate in place. The shaft blocks 111 to 112 of the cube 100 may be provided in a total of 6, but the shaft blocks 111 to 112 coupled to couplers 201 to 205 may be provided in a total of 5, and the other one of the shaft blocks 111 to 112 may be electrically connected to the controller 310 or at least one of the circuit boards 211 to 216 through a cable or the like.

Edge blocks 121 to 129 may be coupled in contact with side surfaces of the shaft blocks 111 to 112 and may be provided in a total of 12, and corner blocks 131 to 137 may be coupled to be interposed between the adjacent edge blocks 121 to 129 and may be provided in a total of 8.

As a result, the cube 100 may include a total of 26 blocks, and one of the shaft blocks 111 to 112, four of the edge blocks 121 to 129, and four of the corner blocks 131 to 137 may be coupled to each surface of the cube 100 to be exposed, and the blocks may be coupled such that blocks constituting each column or each row are rotatable in groups.

FIG. 3 is a diagram showing components of a block according to an embodiment of the present disclosure.

The shaft blocks 111 to 112, the edge blocks 121 to 129, and the corner blocks 131 to 137 may be coupled to the outer surface of the core housing 200, and as shown in FIG. 3, the blocks 111 to 137 may include block covers 111b to 116b, 121b to 129b, and 131b to 137b constituting an outer surface of the cube, and intermediate stationary units 111a to 116a, 121a to 129a, and 131a to 137a having surfaces that support the block covers 111b to 116b, 121b to 129b, and 131b to 137b and is in contact with the outer circumference of the core housing 200. An inner side surface of the intermediate stationary unit, that is, a surface of the intermediate stationary unit, which faces the core housing 200, may be formed to correspond to the outer circumference of the core housing 200 to prevent the blocks from interfering with the core housing 200 when the blocks rotate in contact with the core housing 200.

For example, as shown in FIG. 3(a), the shaft blocks 111 to 112 may include the shaft block covers 111b to 116b and the shaft intermediate stationary units 111a to 116a for rotatably supporting the same, as shown in FIG. 3(b), the edge blocks 121 to 129 may include the edge block covers 121b to 129b and the edge intermediate stationary units 121a to 129a for supporting the same, and as shown in FIG. 3(c), the corner blocks 131 to 137 may include the corner block covers 131b to 137b and corner intermediate stationary units 131a to 137a for supporting the same.

The outer appearance and cross-sectional views of the smart cube excluding a cover of each block are as shown in FIGS. 2, 6 and 7, and the present disclosure will be described with reference to FIGS. 2, 6 and 7 together.

One of the shaft blocks 111 to 112 may be electrically connected to the controller 310 or at least one of the circuit boards 211 to 216 through a cable or the like. Needless to say, a shaft block including a panel 102 may be coupled to rotate in place, and a door 101 may be hinged to open and close the outer surface of the corresponding shaft block.

When the door 101 is opened, the panel 102 having various buttons, a cable connector, or the like, positioned on the outer surfaces of the shaft blocks 111 to 112, may be exposed, and when the door 101 is closed, blocks may have the same outer surfaces as other adjacent blocks.

In order to electrically connect the panel 102 to the controller 310 or at least one of circuit boards 212 to 216, a cable may be embedded to cover a central rotation shaft of any one of the encoders 211a to 216a and central shafts of the rotation connectors 211b to 216b, according to an embodiment, but the present disclosure is not limited thereto, and at least one band formed on the outer circumference of the rotation connectors 211b to 216b and/or the coupling devices 211c to 216c may be embodied in contact with each other using the rotation connectors 211b to 216b and/or the coupling devices 211c to 216c as a connector.

As described above, the core housing 200 may accommodate the circuit boards 211 to 216 therein, the number, shape, and arrangement of the circuit boards are not particularly limited, but as shown in FIG. 7, the circuit board according to an embodiment of the present disclosure may be provided in a total of six of two circular boards 211 and 212 and four square boards 213 to 216, and in this case, the circuit boards 211 to 216 may be installed to face respective surfaces of the cube, and the encoders 211a to 216a axially coupled to the shaft blocks 111 to 112 of the cube may be installed on the circuit boards 211 to 216, respectively.

Two of the circular circuit boards 211 to 216 may be disposed at the top and bottom, the four circuit boards 213 to 216 may be disposed on four surfaces between the top and bottom circular circuit boards 211 to 216, and a space for positioning light emitting devices L1 to L8 may be formed between corners that face each other between two adjacent circuit boards of the four circuit boards. As a result, the eight light emitting devices L1 to L8 may be installed toward the corner blocks 131 to 137.

The four boards 213 to 216 disposed on front, rear, left, and right sides may each be a square board to easily fix the eight light emitting devices L1 to L8. This is because it is advantageous when the four boards 213 to 216 are shaped like a square rather than a circle in order to position the circuit board closest to the light emitting devices L1 to L8.

FIG. 10 is a diagram showing the configuration of a smart cube according to an embodiment of the present disclosure.

As shown in FIG. 10, the smart cube 100 according to an embodiment of the present disclosure may include the controller 310 for recognizing the position of at least one of the blocks 111 to 137 and calculating a solution to configure at least one surface of the cube 100 to have blocks having the same type surface.

The solution to configure at least one surface of the cube 100 to have the same type surface by the controller 310 with respect to blocks that are arbitrarily mixed may use conventionally known layer by layer (LVL) solution, Friedrich solution, Schultz solution, Patras solution, Lu solution, or the like, but the present disclosure is not particularly limited to a specific solution.

In order to calculate the solution, the controller 310 may use a position recognition device 311 for recognition of the positions of the blocks 111 to 137.

The position recognition device 311 may recognize the positions of the blocks 111 to 137 and may use various methods for recognizing the positions of the blocks 201 to 205, but according to an embodiment of the present disclosure, the controller 310 may recognize the position of the block using an encoder.

The encoders 211a to 216a may be a device for detecting the positions of the rotating shaft block or the shaft intermediate stationary units 111a to 116a, and the controller 310 may calculate the rotation direction, rotation amount, and rotation speed of each rotation shaft using the encoders 211a to 216a positioned on each rotation shaft of the cube. The controller 310 may recognize not only the positions of the shaft blocks 111 to 112 but also the positions of the edge blocks 121 to 129 and/or the corner blocks 131 to 137 coupled to the shaft blocks 111 to 112 using the rotation direction and the rotation amount that are calculated for each rotation shaft.

The encoders 211a to 216a according to an embodiment of the present disclosure may be generally an optical type, a magnetic type, an inductive type, or the like but the present disclosure is not particularly limited to the encoder method.

According to another embodiment of the present disclosure, an inductive sensor may detect rotation of the blocks and may recognize the positions of the blocks.

The inductive sensor may detect rotation of a conductor close to a sensor coil by detecting an oscillation frequency changed by the conductor using an oscillator and the sensor coil electrically connected thereto.

To this end, according to another embodiment of the present disclosure, the inductive sensor including an oscillator and an oscillation circuit may be installed on the board, and a conductor plate 400 may be installed inside the intermediate stationary units 111a to 116a of the shaft blocks 111 to 112 to face the coils of the inductive sensor.

In this case, as shown in FIG. 8, the conductor plate 400 may be a plate-shaped conductor with a width that changes in a circumferential direction, and when the conductor plate 400 rotates around the center according to rotation of the shaft blocks 111 to 112, the controller 310 may detect the rotation direction and/or rotation amount of the conductor by detecting an oscillation frequency changed by the sensor coil.

The sensor coil may be provided in plural, and in detail, each of two pairs of differential coils may be arranged to correspond to the respective positions of upper, lower, left, and right sides based on the center of the conductor plate 400, but the present disclosure is not limited thereto.

As a result, the controller 310 may recognize the positions of the blocks 111 to 137 using various methods or the like and may calculate a solution to configure at least one surface of the cube 100 to have the blocks 111 to 137 having the same type surface based on the identified positions of the separate blocks 111 to 137.

In this case, the solution may include at least one step and, optimally, in the case of 3×3×3 cube, the solution may include steps within 20 rotations. Thus, the controller 310 may calculate the solution based on the positions of the current positions of the blocks 111 to 137, and in this case, the controller 310 may visually output a next step of the current step among a plurality of steps to propose a solution for allowing a user to match the cube blocks.

The solution may be proposed to the user using various methods through the cube 100, but the cube 100 according to an embodiment of the present disclosure may include at least one light emitting device 340 for making the at least one block emit light, and in this case, the light emitting device 340 may allow at least two blocks to be rotated to sequentially blink in a rotation direction according to the solution calculated by the controller 310.

For example, as shown in FIG. 11, assuming that groups including blocks denoted by reference numerals 137, 128, 135, 126, and 137 need to be rotated to the right in order to match the cube blocks in the current step, a solution of the next step may be visually proposed to the user by allowing the blocks denoted by reference numerals 137, 128, 135, 126, and 137 to sequentially blink.

To this end, according to an embodiment of the present disclosure, the smart cube 100 may include at least one light emitting device 340, and in this case, the plurality of light emitting devices L1 to L8 may be installed at positions corresponding to the blocks 111 to 137.

According to an embodiment, as shown in FIG. 9, the light emitting devices L1 to L8 may be installed at positions corresponding to the blocks 111 to 137 of the block on the outer circumference of the core housing 200. Accordingly, the first light outlets 201 to 206 may be formed through the outer circumference of the core housing 200 to correspond to the positions of the corner blocks 131 to 137, respectively, and similarly, inner side surfaces of the corner blocks 131 to 137, in detail, the corner intermediate stationary units 131a to 137a may have second light outlets 131c to 137c to allow light exposed through the first light outlets 201 to 206 to be emitted outward.

Needless to say, according to another embodiment, the light emitting devices L1 to L8 may be installed at the respective positions corresponding to the edge blocks 121 to 129 as well as at the positions corresponding to the blocks 111 to 137. Thus, the first light outlets may be formed through the outer circumference of the core housing 200 at the respective positions corresponding to the edge blocks 121 to 129, and similarly, inner side surfaces of the edge blocks 121 to 129, in detail, the edge intermediate stationary units 121a to 129a may have second light outlets corresponding to the first light outlets.

As a result, through blinking of the light emitting devices L1 to L8, light may sequentially pass through the first light outlets 201 to 206 and the second light outlets 131c to 137c in an outward direction to allow the blocks 111 to 137 to blink. In detail, the blocks 111 to 137, in particular, the block covers 111b to 116b, 121b to 129b, and 131b to 137b may be formed of a light transmissive material, and the light emitting devices L1 to L8 may each be a LED light source having high straightness and high luminous intensity.

In this case, according to an embodiment of the present disclosure, the light emitting devices L1 to L8 may output at least 6 colors and may change the states of the blocks to an arbitrary state or to a preset state according to user input, and for example, may propose a combination of blocks constituting arbitrary colors according to the user input or may change the states of the blocks to a combinations of blocks in a pre-stored state according to the user input.

The cube 100 according to an embodiment of the present disclosure may include the communication unit 330 that is connected to be able to communicate with an external terminal and is capable of transmitting information on the position of the at least one block.

Here, the terminal may be a portable terminal or a fixed terminal without being particularly limited, and the communication unit 330 may also be a wireless Internet module or a mobile communication module such as a wireless LAN (WLAN), wireless fidelity (Wi-Fi) direct, digital living network alliance (DLNA), wireless broadband (Wibro), world interoperability for microwave access (Wimax), or high speed downlink packet access (HSDPA), or a short range communication module such as Bluetooth™, radio frequency identification (RFID), infrared data association (IrDA), ultra wideband (UWB), ZigBee, or near field communication (NFC).

The controller 310 may transmit information on the position of at least one block to an external terminal using the communication unit 330, and thus may provide various environments in which the user is capable of learning and improving puzzle solving ability or improve interest induction through the terminal, and for example, the user may output the state of a corresponding block on a screen of the terminal, the state of a block, which is set by the terminal or is pre-stored, may be transmitted to the cube 100 and may be synchronized therewith, the time taken to match a corresponding block may be measured using the time when the user starts matching the block and the time when the block is completely matched, a movement history of the block may be stored for the user to match the block, or the user may be connected online to another unspecified user and may compete for matching blocks within a short time.

In addition, the controller 310 may perform a controller function of inputting an operation of content (e.g., a game) of various terminals using the characteristics of rotating in various ways of the smart cube 100. That is, according to an embodiment of the present disclosure, the communication unit 330 may transmit information on the rotation direction, rotation speed and/or rotation amount of the cube block to the external terminal such that the smart cube 100 is capable of operating as an input device (or a controller) of an external terminal connected to communicate. In detail, the smart cube 100 may operate as a control input device for content reproduced by the external terminal.

As at least one surface of the cube is rotated by the user, various control commands for content reproduced according to rotation of the cube may be input to the external terminal.

For example, the smart cube according to an embodiment of the present disclosure may be utilized as a controller of various games, and for example, a forward or backward movement command may be transmitted depending on a rotation direction of one surface of the cube, a movement speed command corresponding to a rotation speed may be transmitted to an external terminal depending on the rotation speed of one surface of the cube, or a selection command for determining a rotation target may be transmitted to the external terminal depending on which surface is a rotating surface of the cube.

In detail, FIG. 12 is a diagram showing an example of content using which a smart cube is used as a controller of an external terminal according to an embodiment of the present disclosure.

As shown in FIG. 12(a), an external terminal that is connected to a smart cube of a user to communicate therewith may provide content for competing with a remote unspecified user connected online with a subject smart cube within a short time by outputting the current state of the subject smart cube and the current state of each block of the smart cube of the remote unspecified user.

As shown in FIG. 12(b), the external terminal may reproduce a rhythm/beat game, and according to requirements presented in accordance with music, the smart cube may receive information on various rotation directions and may transmit the information as input of the external terminal.

As shown in FIG. 12(c), the external terminal may reproduce a fighting game and may control movement of character according to various rotation inputs of the smart cube. For example, when an upper surface is rotated clockwise based on the current state of the smart cube, the character may punch, when a lower surface is rotated clockwise, the character may attack with a kick, when the upper or lower surface is rotated counterclockwise, the character may defend, or when a cube fit formula (such as a U-shaped formula) is input, the character may perform a special skill.

In another example, when the external terminal is a remote control power vehicle or an automatic driving entertainment device, the user may control a car to move forward or backward at a cube rotation speed or may control the car to change a steering direction depending on which surface is a rotating surface of the cube according to user manipulation by rotating at least one surface of the cube.

The smart cube 100 according to an embodiment of the present disclosure may determine which surface is a rotating surface and a direction in which the rotating surface rotates based on a side at which the door 101 is positioned as the absolute standard, but the present disclosure is not limited thereto, and the smart cube 100 may recognize the current posture of the cube and may determine which surface is a rotating surface, and a direction in which the rotating surface rotates using an accelerometer sensor (not shown) included in the smart cube 100.

As described above, any one of the blocks 111 to 137 may have the door 101 to be opened and closed, and a corresponding block may have a surface 102 that is exposed when the door 101 is opened and provides an input device for receiving various inputs from a user or a charging terminal for charging a battery.

The input device is not particularly limited, but may include a power button for turning operation power ON/OFF, a reset button for resetting when an error occurs such as misrecognition of the position of a block, an answer output button for calculating and displaying a solution, a button for communicating with a terminal, and a button for synchronizing the terminal and the current state of the block.

As such, according to the present disclosure, general users may be motivated to have interest in the cube to more frequently use the cube as a brain development tool by intuitively providing a solution to the user such that anyone can easily solve the cube that is rather difficult.

Method of Operating Smart Cube

FIG. 13 is a stepwise flowchart showing a method of operating a smart cube according to an embodiment of the present disclosure.

As shown in FIG. 13, according to an embodiment of the present disclosure, a method of operating a smart cube including a plurality of blocks having a surface formed therein to correspond to an outer circumference of the core housing 200 having an accommodation space therein and coupled to each other to be rotatable in a group around the core housing 200 may include recognizing the position of at least one of the blocks by the controller 310 (S10), calculating a solution to place blocks having the same outer surface on at least one surface of the cube by the controller 310 (S20), and visually outputting a next step of the current step of the solution including a plurality of steps by the plurality of blocks (S30), thereby providing a solution to the user such that anyone can easily solve a cube that is rather difficult.

In this case, the blocks 111 to 137 may include the shaft blocks 111 to 112 coupled to the center of each of top, bottom, front, rear, left, and right surfaces of the core housing, the edge blocks 121 to 129 in contact with each side surface of the shaft block, and the corner blocks 131 to 137 interposed between the adjacent edge blocks, and in the recognizing of the position (S10), the controller 310 may recognize the position of at least one of the blocks 111 to 137 based on the rotation direction and rotation amount of the shaft blocks 111 to 137.

According to an embodiment of the present disclosure, in the outputting (S30), at least one light emitting device 340 for emitting light to the blocks 111 to 137 may allow the blocks 111 to 137 as a rotation target to sequentially blink in a rotation direction according to the solution.

According to another embodiment, the communication unit 330 that is connected to be able to communicate with an external terminal may further perform transmitting (not shown) information on the position of the at least one block to the terminal, and thus may provide various environments in which the user is capable of learning and improving puzzle solving ability or improve interest induction through the terminal, to the user.

In addition, according to another embodiment of the present disclosure, the communication unit 330 may further perform transmitting (not shown) information on rotation of a cube block to the external terminal to allow the smart cube 100 to operate as an input device (or a controller) of the external device connected to communicate therewith. That is, the smart cube according to an embodiment of the present disclosure may be operated as a controller of various games.

However, the operations shown in FIG. 13 or the aforementioned operations according to an embodiment of the present disclosure are not required, and thus a method of operating a smart cube having more or fewer operations may be implemented.

Since the description of each operation is the same as the above description, the description thereof will be omitted and will be replaced.

Computer-Readable Recording Medium

The method of operating a smart cube according to an embodiment of the present disclosure described above may be implemented in the form of a program instruction to be executed through various computer components and may be recorded in a computer-readable recording medium.

The computer-readable recording medium may include a program instruction, a data file, a data structure, etc. alone or in combination. The program instruction recorded in the computer readable recording medium may be specially designed and configured for the present disclosure or may be known and used by those skilled in the computer software field. Examples of the computer-readable recording medium include a hard disk, a magnetic medium such as a floppy disk and a magnetic tape, an optical recording medium such as a CD-ROM and a DVD, and a magneto-optical medium such as a floptical disk, and a hardware device specially configured to store and execute a program instruction, such as ROM, RAM, and a flash memory. Examples of the program instruction include not only machine language codes such as those generated by a compiler but also high-level language codes to be executed by a computer using an interpreter or the like. The hardware device may be configured to operate as one or more software modules to perform processing according to the present disclosure, and vice versa.

The exemplary embodiment of the present disclosure has been described in detail with reference to the drawings. The description of the present disclosure is for illustrative purposes, and those of ordinary skill in the art to which the present disclosure pertains will understand that present disclosure can be easily modified into other specific forms without changing the technical spirit or essential features of the present disclosure.

Accordingly, the scope of the present disclosure is indicated by the claims described below rather than the above detailed description, and all changes or modifications derived from the meaning, scope, and equivalent concept of the claims are construed as being included within the scope of the present disclosure.

The invention claimed is:

1. A smart cube comprising:
a core housing having an accommodation space therein;
a plurality of blocks having a surface formed therein to correspond to an outer circumference of the core housing and coupled to each other to be rotatable in a group around the core housing; and
a controller configured to recognize a position of at least one of the blocks and to calculate a solution to place blocks having the same outer surface on at least one surface of the cube,
wherein:
the block includes types of shaft blocks coupled to a center of each of top, bottom, front, rear, left, and right surfaces of the core housing, edge blocks in contact with each side surface of the shaft block, and corner blocks interposed between the adjacent edge blocks;
the controller recognizes a position of at least one of the blocks based on a rotation direction and a rotation amount of the shaft block; and
the plurality of blocks visually outputs a next step of a current step of the solution including a plurality of steps.

2. The smart cube of claim 1, wherein the block includes a block cover that forms an outer surface of the cube, and an intermediate stationary unit having a surface that supports the block cover and is in contact with the outer circumference of the core housing.

3. The smart cube of claim 2, wherein:
the core housing accommodates a battery and a circuit board for implementing the controller in the accommodation space;
the smart cube includes an inductive sensor installed on a substrate in the core housing, and a conductor plate installed inside the intermediate stationary unit of the shaft block to face the inductive sensor, the conductor plate having a width that changes in a circumferential direction; and
the controller recognizes the rotation direction and the rotation amount of the shaft block.

4. The smart cube of claim 3, wherein:
one of the blocks includes a door to be opened and closed, and a panel including an input device for receiving user input or a charging terminal for charging the battery is exposed when the door is opened; and
the panel is electrically connected to the circuit board through the encoder and the rotation connector.

5. The smart cube of claim 2, wherein:
the core housing accommodates a battery and a circuit board for implementing the controller in the accommodation space; and
the smart cube further includes a rotation connector coupled between an encoder installed on a substrate in the core housing and the intermediate stationary unit and coupled to allow the intermediate stationary unit to rotate around the encoder.

6. The smart cube of claim 5, wherein:

one of the blocks includes a door to be opened and closed, and a panel including an input device for receiving user input or a charging terminal for charging the battery is exposed when the door is opened; and the panel is electrically connected to the circuit board through the encoder and the rotation connector.

7. The smart cube of claim 1, wherein:

the smart cube further includes at least one light emitting device configured to make the block emit light; and the light emitting device allows at least two blocks to be rotated to sequentially blink in a rotation direction according to the solution.

8. The smart cube of claim 7, wherein:

the corner block includes a corner block cover that forms an outer surface of the cube, and a corner intermediate stationary unit having a surface that supports the corner block cover and is in contact with an outer circumference of the core housing;

the core housing includes at least one first light outlet for allowing light of the light emitting device to be emitted outward; and the corner block cover includes at least one second light outlet for allowing light to be emitted through the first light outlet to be emitted outward.

9. The smart cube of claim 7, wherein:

the edge block includes an edge block cover that forms an outer surface of the cube, and an edge intermediate stationary unit having a surface that supports the edge block cover and is in contact with an outer circumference of the core housing;

the core housing includes at least one first light outlet for allowing light of the light emitting device to be emitted outward; and the edge block cover includes at least one second light outlet for allowing light passing through the first light outlet to be emitted outward.

10. The smart cube of claim 1, further comprising:

a communication unit connected to be able to communicate with an external terminal and configured to transmit information on a position of the at least one block.

11. The smart cube of claim 1, further comprising:

a communication unit connected to be able to communicate with an external terminal and configured to transmit information on rotation of the block to the terminal to allow the smart cube to operate as a control input device of content reproduced by the terminal.

12. A method of operating a smart cube including a plurality of blocks having a surface formed therein to correspond to an outer circumference of an outer circumference of a core housing having an accommodation space therein and coupled to each other to be rotatable in a group around the core housing, the method comprising:

recognizing a position of at least one of the blocks, by a controller;

calculating a solution to place blocks having the same outer surface on at least one surface of the cube, by the controller; and visually outputting a next step of a current step of the solution including a plurality of steps by the plurality of blocks, wherein:

the block includes types of shaft blocks coupled to a center of each of top, bottom, front, rear, left, and right surfaces of the core housing, edge blocks in contact with each side surface of the shaft block, and corner blocks interposed between the adjacent edge blocks; and the recognizing the position includes recognizing a position of at least one of the blocks based on a rotation direction and a rotation amount of the shaft block.

13. The method of claim 12, further comprising:

transmitting information on rotation of the block to the terminal to allow the smart cube to operate as a control input device of content reproduced by the terminal, by a communication unit of the smart cube, connected to be able to communicate with an external terminal.

* * * * *